(12) United States Patent
Aguren

(10) Patent No.: US 9,077,973 B2
(45) Date of Patent: Jul. 7, 2015

(54) WIDE FIELD-OF-VIEW STEREO VISION PLATFORM WITH DYNAMIC CONTROL OF IMMERSIVE OR HEADS-UP DISPLAY OPERATION

(71) Applicant: Jerry G. Aguren, Tomball, TX (US)

(72) Inventor: Jerry G. Aguren, Tomball, TX (US)

(73) Assignee: DRI SYSTEMS LLC, Tomball, TX (US)

( * ) Notice: Subject to any disclaimer, the term of this patent is extended or adjusted under 35 U.S.C. 154(b) by 319 days.

(21) Appl. No.: 13/690,431

(22) Filed: Nov. 30, 2012

(65) Prior Publication Data

US 2014/0002587 A1 Jan. 2, 2014

Related U.S. Application Data

(60) Provisional application No. 61/666,110, filed on Jun. 29, 2012.

(51) Int. Cl.

| H04N 15/00 | (2006.01) |
|---|---|
| H04N 13/02 | (2006.01) |
| H04N 5/232 | (2006.01) |
| H04N 13/04 | (2006.01) |
| H04N 5/225 | (2006.01) |
| H04N 5/272 | (2006.01) |

(52) U.S. Cl.
CPC ........ *H04N 13/0203* (2013.01); *H04N 5/23238* (2013.01); *H04N 13/044* (2013.01); *H04N 5/2254* (2013.01); *H04N 5/2258* (2013.01); *H04N 5/272* (2013.01)

(58) Field of Classification Search
CPC ............ H04N 13/044; H04N 13/0203; H04N 5/23238; H04N 5/2254; H04N 5/2258; H04N 5/272
USPC ............ 386/224, 223, 227, 230, 242; 348/36, 348/42, 46, 47, 51, 52, 54
See application file for complete search history.

(56) References Cited

U.S. PATENT DOCUMENTS

| 8,089,506 B2 * | 1/2012 | Takayama et al. .............. 348/42 |
|---|---|---|
| 2010/0013910 A1 | 1/2010 | Farr |
| 2010/0238161 A1 | 9/2010 | Varga et al. |
| 2011/0018903 A1 | 1/2011 | Lapstun et al. |

OTHER PUBLICATIONS

International Search Report and Written Opinion dated Mar. 11, 2013 for PCT/US12/67234.

* cited by examiner

*Primary Examiner* — Robert Chevalier
(74) *Attorney, Agent, or Firm* — Patterson & Sheridan, L.L.P.

(57) ABSTRACT

Embodiments of the invention generally relate to 3D stereo vision goggles or other platforms that could be used for enhanced vision systems for surgical applications, for patients with macular degeneration, or for entertainment or business applications. The invention takes images received from a video input source, and segments and projects those images off a mirror defined by a portion of an ellipsoid and directly onto the retina of the eye of a user. The invention allows users to enjoy 3D stereoscopic vision with an increased field of view, increased image quality, increased comfort, reduced cost, and other benefits.

20 Claims, 15 Drawing Sheets

(a)  (b)

(a)  (b)

(a)  (b)

(a)            (b)

WIDE FIELD-OF-VIEW STEREO VISION PLATFORM WITH DYNAMIC CONTROL OF IMMERSIVE OR HEADS-UP DISPLAY OPERATION

BACKGROUND OF THE INVENTION

1. Field of the Invention

This invention relates generally to 3D stereo vision goggles or other platforms, that can be used for enhanced vision systems for use with endoscopic surgery, robotic assist surgery, open surgery, and surgical microscopes; as visual aids for patients with medical conditions such as Macular Degeneration; and for business and entertainment applications for which a 3D stereo vision display would be desirable

2. Description of the Related Art

Today a surgeon has several types of vision enhancing tools to choose from in treating his patient. The main visual tools presently in use are; remote 3D vision used with robotic assist systems, eye loops used with open surgery, endoscopic cameras, and 2D and 3D cameras used with surgical microscopes. All of the visual tools have been built to improve the surgeon's sight primarily through magnification.

In one example, robotic assist surgery uses a four arm robotic system to hold endoscopic tools. The surgeon performs the surgery by sitting at a remote console where he controls the robotic arms that are holding the endoscopic tools and camera. The robotic assist system uses a 3D endoscopic camera where the camera images are displayed on two high-resolution, high-definition flat screen displays. The surgeon views the two displays through two wide angle lenses. The surgeon can see the operation with depth perception and reasonable resolution, but a fairly narrow field-of-view. Moreover, the surgeon must keep his head at a specific location and remain motionless in order to keep the stereo image in full display.

In open surgery, magnifying glasses called eye loops are routinely used. The magnification is good and so is the resolution, but the field-of-view is narrow and there is a proportional relationship between head motion and magnification.

In endoscopic surgery, the endoscope allows the surgeon to operate on a patient by making small incisions and inserting long thin tools used to conduct the operation with one hand, then inserting a long thin tool with a miniature camera at the end and holding it with the other hand. The surgeon coordinates the movement of the tools by viewing the operation on flat panel display. Endoscopy requires the surgeon to generally look at a flat screen monitor that is 2D and typically not at the optimal position. For example, the monitor is placed to the side such that the surgeon performs the surgery with his head turned to the side. This is unnatural compared to looking down at your hands as is done during normal open surgery.

Specialized stereo microscopes have been developed that allow surgical procedures to be performed using a highly magnified image with depth perception, but just as with the robotic assist stereo display the surgeon must keep his head fixed peering into the microscope's eyepieces.

Even though these tools have been developed to extend the surgeon's unaided eye, there still remain some common problems with all of these systems. All four visual tools have an excellent rating on one, and sometimes two of several visual parameters—such as, acuity, magnification, field-of-view, depth perception, focusing (manual or automatic), contrast ratio, cost, and ergonomics—that are typically used to characterize and compare surgical vision systems' visual parameters. For example, a stereo 3D vision system used with a microscope magnifies an object and provides depth, and acuity is good, but the field-of-view is very narrow, the initial system is expensive, and the ergonomics are poor. The ergonomic parameter is related to how natural or unnatural your body position is when using the tool, and is generally a measure of comfort. Architectures for new devices that can extend one or more visual parameters while maintaining the remaining parameters at a level equivalent to the unaided eye has proven to be elusive. A new architecture is required for medical vision systems that optimize all visual parameters.

Although the description below focuses on the application of this invention in medical surgery, it is equally valid to apply it as a vision aid for people with retinal degradation or other visual deformities. For instance, the goggles or other embodiments of the invention described herein could be used by patients with Macular Degeneration. The invention could also be used for business and entertainment uses as discussed below.

SUMMARY OF THE INVENTION

The present invention is a new type of 3D stereo vision goggle or other platform. Features of the preferred embodiment of goggles include total horizontal display with a field-of-view of 120 degrees for each eye, and a 60 degree binocular overlap between both left and right eyes, a partially mirrored ellipsoid section on the inside of each side of the goggle that places an image directly on the back of the retina of each eye, and vergence focus based on real time eye tracking and control of eye gaze, creating a high-definition 3-D image for the wearer. Embodiments of the invention also include additional components and methods such as automatic alignment of the vision system to the wearer's eyes, dynamic control of immersive or see-through operation, a three axes head position sensor, and the ability to programmatically adjust the display to accommodate the wearer's eye prescription, including, but not limited to, magnification and astigmatism. The invention could also be used with vision systems for business and entertainment applications. Correction of geometric aberrations and distortion uses technology from several engineering fields, including optics, control theory, electronics, mechanical engineering, and software engineering.

BRIEF DESCRIPTION OF THE DRAWINGS

In order that the invention can be better understood, the following section provides, as example only, different embodiments of the invention that later will be described and referenced.

FIG. 19a is a simulation of an output image from the high resolution wide field of view camera.

FIG. 19b is a magnification of the simulated image in FIG. 19a.

DETAILED DESCRIPTION

The embodiment of the invention presented in this section consists of a vision system with external image processing and a display electronic package that enables the wearer to receive a 3D stereoscopic image directly on the retina of their eyes. The invention described herein can be applied to other display technologies, such as movie displays and displays used for business applications, and provide viewers with the benefits of the invention described herein.

The invention applies methods from multiple engineering disciplines, such as system design, optical design, electrical design, mechanical design, control theory, and software in a goggle vision system with the primary features of high resolution, improved acuity, wide field-of-view, superior depth perception, and focusing based on vergence control.

One embodiment of this invention looks like a pair of ski goggles. An organic light emitting diode (OLED) array is used to generate an image that is projected through a series of lenses, reflected off a spinning polygon mirror, and reflected off mirrors. The image then reflects off the final mirror that has the shape of a section of an ellipsoid. Images are generated to seem as if it emanated from one of the ellipsoid's two foci, then the ellipsoid sector is oriented such that the other focus point is at the goggle wearer's eye's center-of-rotation. The image reflecting off of the ellipsoid section places the image onto the retina of the wearer.

Figure 1:
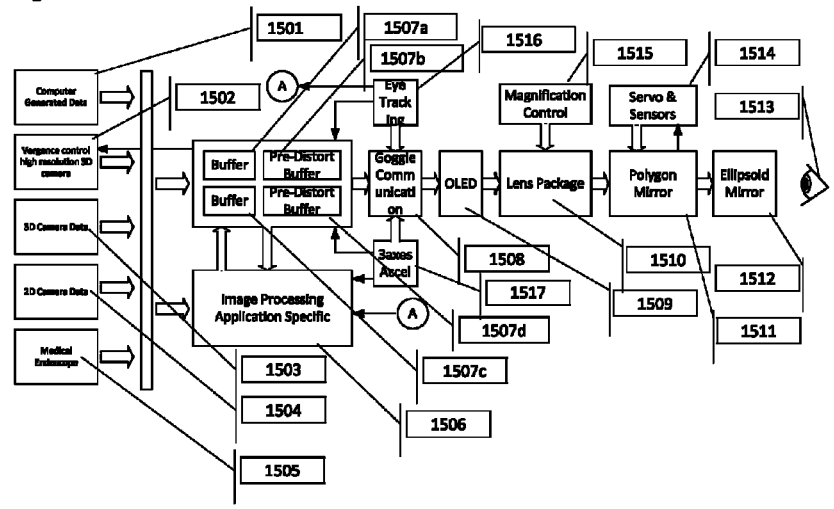
FIG. 1 is a block diagram of the image path for each eye within one embodiment of the vision platform.

A block diagram of the image path within an embodiment of the complete vision system platform is shown in FIG. 1. Multiple camera types such as standard 2D camera 1504, medical endoscope 1505, 3D cameras 1503, and a new type of camera called a vergence controlled high resolution camera 1502, can be used. Computer generated images 1501 can also be used, such as if the system is used for a 3D computer simulation or for entertainment. The details of a vergence controlled camera are described below.

In operation, only one of the inputs 1501-1505 will be used at a time for each eye.

Image data from the camera or other input flows initially into the display controller's buffers 1507. The memory size of each buffer and "Pre-Distort" buffer 1507b and 1507d is large enough to contain all of the pixels for an entire image plus metadata for each pixel. The buffers are segmented into equal parts which each segment has the memory size equal to the number of pixels in the OLED array 1315. The number of segments is equal to the number of facets on the polygon mirror 501. From the buffers 1507a and 1507b the data is mapped to "Pre-Distort" buffers 1507b and 1507d. The mapping takes into consideration distortions caused by the optical path as well as the wearer's eye prescription, as described further in FIG. 7. The display controller transmits the data from the "Pre-Distort" buffer in segments to the goggles. Additional input from sensors 1517 and eye tracking 1516 can modify how the data is mapped into the Pre-Distort buffer. The Pre-distort buffer is continuously updated to the goggle communication interface 1508. Some embodiments can have more than one goggle to update, such as solutions applied to surgery. During most surgeries there are multiple surgeons present, or there may be medical students present. The application specific module 1506 provides multiple attachment ports so several goggles could see the same image as the primary surgeon.

Display data received by the goggle 1508 is moved using Direct Memory Access (DMA) to the Organic Light Emitting Diode (OLED) array 1509. The image formed by the OLED goes through a set of lenses in the lens package 1510. The output of the lens package reflects off of a folding mirror then reflects off a servo controlled polygon mirror 1511. The image coming off the polygon mirror reflects off of a specific sector of an ellipsoid mirror 1512 which has one of its focus points positioned at the center of rotation of the wearer's eyes. The image passes through the wearer's pupil and lens then onto the wearer's retina 1513.

Using a polygon mirror is one way of displaying the image. The repetitive update of all of the segments using the same sequence is called raster scanning. As an alternative to the rotating polygon mirror, or raster scanning, the system could use vector scanning. Vector scanning allows any segment to be updated in any order. Implementation is typically done with two independent mirrors and two motors. Since each mirror is attached to its own motor, each mirror can be placed at any angle. This allows segments to be displayed in any sequence. While there are only two ways of updating the segmented image, which are raster scanning and vector scanning, there are multiple ways of creating the segments that constitute in aggregate the image.

One embodiment of the invention uses an OLED as a light emitting device for generating a small piece of the image which is called a segment. There are other technologies that can used to generate the segmented images. They include Liquid Crystal Display (LCD), Light Emitting Diode (LED), and laser scanning. The latter can use both raster and/or vector scanning.

Additional features include but are not limited to dynamic control of the lens magnification 1515 and velocity control of the motor driving the polygon 1514. The velocity must stay locked at the 60 hertz rate. The 60 hertz frequency is locked in frequency and phase using feedback control theory. When the vertical pulse frequency varies, the entire frame shifts up and down, causing disorientation to the wearer.

Real time eye tracking 1516 over the entire eye movement envelope is an essential function to support vergence control and vergence focus. The eye makes large angular movements called saccadic motion. This motion can result in the eye reaching maximum velocities of 500 degrees/second and accelerations of 2000 degrees/sec^2. Fast sample rate cameras with sample rates of 200 hertz or higher are required to adequately track the position of the eye.

Some embodiments require special processing that is not available in the display controller, such as surgical eye loupes used to magnify the operating field seen by the surgeon. Sensor data input from the goggle's accelerometers and image processing from stereo 3D cameras are required for this embodiment. A separate application specific module 1506 is used to support the embodiment's requirements.

Figure 2:
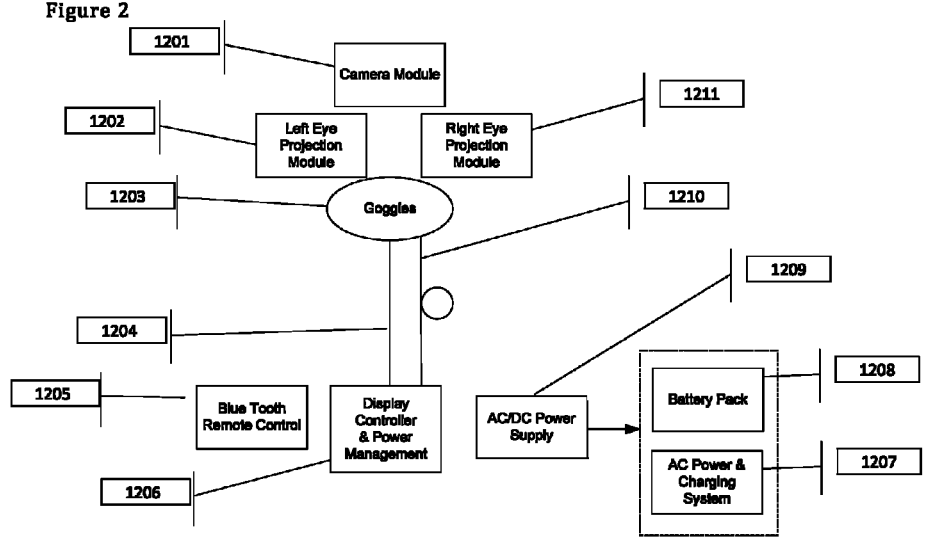
FIG. 2 is a block diagram of the main hardware components of one embodiment of the entire vision system platform.

A block diagram of hardware components of one embodiment of the vision platform is shown in FIG. 2. The main components are the goggles 1203 and a processor that acts as a display controller 1206. A cable assembly 1204 connects the goggle and display controller.

The cable assembly 1204 comprises two copper wires for power and ground, and four fiber optic cables. The optic link is used for sending images to the goggles which then present the images to the retinas of the left eye and the right eye. Also, the left and the right camera images for the camera module 1201 are sent from the camera module to the display controller, along with other data such as diagnostics, code debug, and error codes.

The goggle 1203 comprises a Left Eye Projection Module 1202 and Right Eye Projection Module 1211 and a Camera Module 1201, which may be mounted to the goggle or not mounted to the goggle. Each projection module comprises a self-contained set of optical, electrical and mechanical parts. Each projector module has the functionality to align to the wearer's eyes.

The display controller 1206 can operate in multiple configurations. For example, for patients with retinal diseases, such as Macular Degeneration, the display controller is mobile and runs on a battery. The controller is small enough for the patient to wear it on their hip or could be attached to the goggles themselves. Another configuration is in support of surgeries. The display controller configuration for surgical applications consists of the image processing electronics, software and display electronics.

Figure 3:
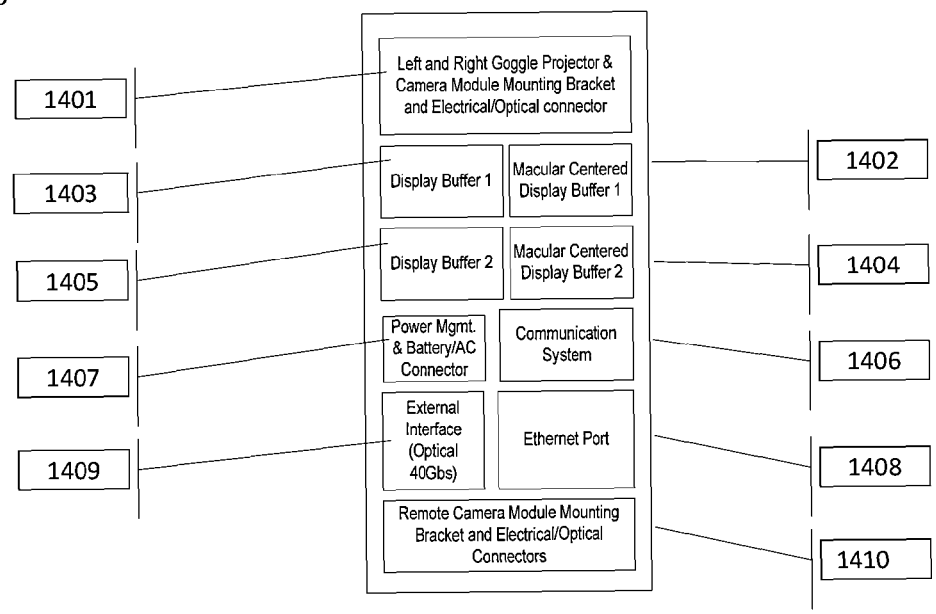
FIG. 3 is a block diagram of a processor that acts as a display controller.

A detailed block diagram of the display 1206 controller is shown in FIG. 3. The Display Controller has five external interfaces.
  a. Goggle electrical and optical connector 1401.
  b. Remote camera electrical and optical connector 1410. This is used for connecting to the video input.
  c. External electrical and optical connector 1409. This is for use by third party companies to integrate the vision platform into their products.
  d. Ethernet port 1408, which is used for software development and diagnostics.
  e. Power module interface 1407, which supports two types of power modules, one for AC and the other for battery power.

Coordinating the communication among the external and internal modules is accomplished by the communication system 1406. The display buffers 1403 and 1405 receive data from external video inputs. Each display buffer 1403 and 1405 consists of two internal buffers, as shown further in 1507 of FIG. 1. The first internal buffer receives the incoming camera data and the second takes the data from the first buffer and pre-distorts the data. The pre-distortion corrects for Keystoning, distortion caused by curved mirrors, and wearer's eyeglass prescriptions. The data from the pre-distortion buffer is transmitted to the output buffer in the goggle's projector and camera module 1401. The macular centered display buffers 1402 and 1404 receive camera data from the camera module located in the goggles. Each buffer 1402 and 1404 contains two sub-buffers, one for high resolution narrow field-of-view images and the second for wide field-of-view peripheral images. The images are mixed together with the narrow field-of-view high resolution image placed where the wearer's eyes are pointed. This is part of the concept called vergence control. Vergence control is covered in greater detail below in the discussion of the new camera developed as part of this invention.

This invention aligns and adapts to the differences in a wearer's facial geometry; such as differences in the width of a wearer's eyes, the vertical height of one eye to the other, or if a wearer has a flat forehead or a slopped forehead. This invention can align to each eye. This is accomplished by making the printed circuit boards dedicated to an axis. For example there is an x axis and a y axis. The z axis moves in a linear direction and in a rotational pitch direction. This provides a total of four dimensions for each eye.

The previous components and modules when form a vision platform can be customized for a specific application, be it patient use, surgical applications, or other applications.

One embodiment of this invention has an appearance very similar to a standard ski goggle. An example of such a general goggle structure is shown generally in FIGS. 5a, 5b, and 5c, with a specific embodiment of the goggle structure shown in FIG. 6(c), showing a front view, and FIG. 4, showing a top view.

Figure 4:
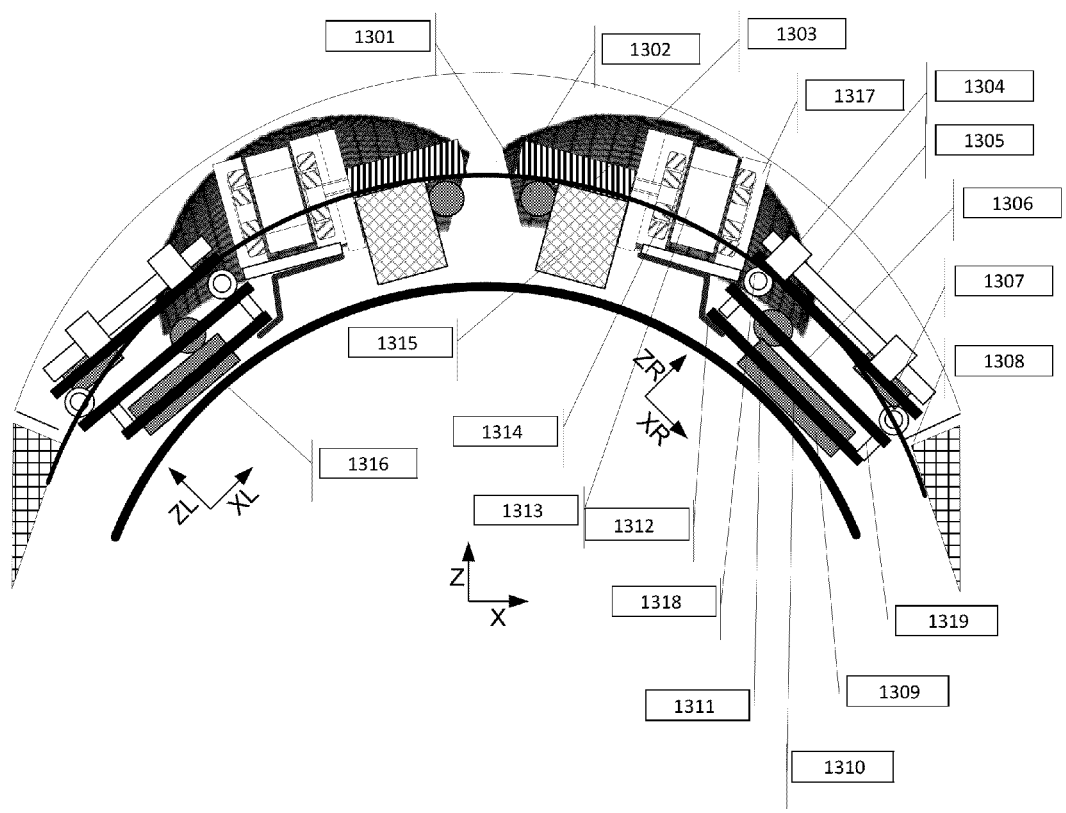
FIG. 4 is a top view of one embodiment of the goggle.

The components on the right side of the goggle for projecting images onto the retina of the right eye in FIG. 4 are replicated on the left side of the goggle for the left eye. The drawing shown in FIG. 4 is the top view of the goggle. There are six coordinate systems used in the goggle; five are local coordinate systems for the left and right projectors, left and right eye tracking, and a 3-axes accelerometer. The sixth is a global coordinate system that establishes the reference point among the local coordinate systems. Mathematically, the reference point is defined using homogeneous transfer equations that are common in computer graphics and robotic control.

There are three printed circuit boards (PCBs) that are used to align the right projector to the right eye. XR and ZR (YR is going into the page) are the local references for the x, y and z axes of the right projector. XL and ZL (YL is going into the page) are the local projector references for the x, y, and z axes for the left projector. X and Z are the global coordinate system.

Figure 9:
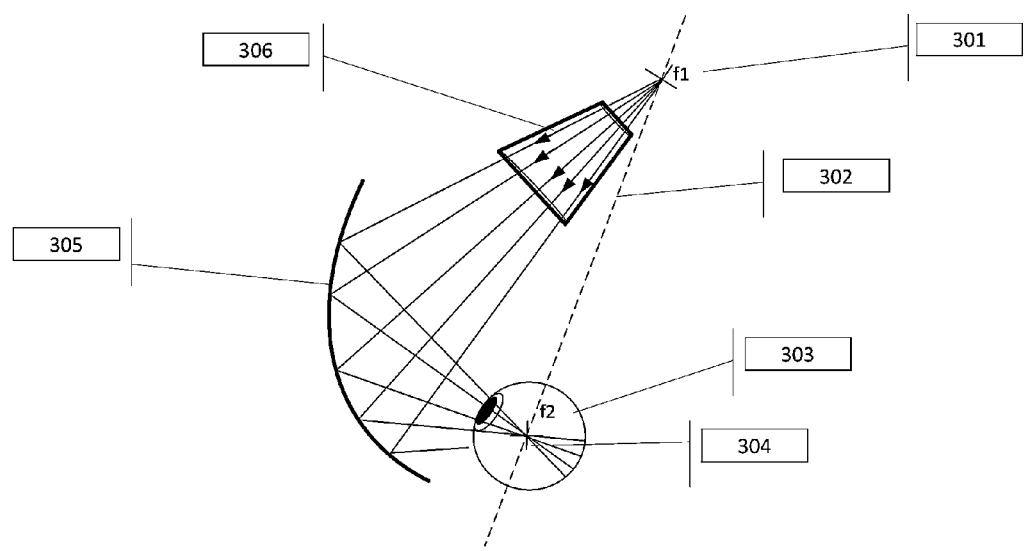
FIG. 9 illustrates light taken as a ray emitted from one foci of an internally mirrored ellipsoid through an optical subassembly and through another foci located in a wearer's eye.

Starting at the x axis board 1305 the x axis motor 1307 can move the PCB which is attached to bushings 1304 and shaft 1305. The x axis motor can move the PCB approximately plus or minus 0.250 inches from its nominal position. The y axis PCB 1311 is attached to the x axis board 1305 through bushing and shafts 1318. Movement of the x axis board also moves the y axis board. The z axis board 1310 is attached rigidly to the y axis board 1311 using spacers. The z axis motor 1309 is attached to the bracket 1312. The entire optical system is attached to the bracket 1312. The optical system consists of elements annotated by focus adjustment motor 1301, ellipsoid mirror 1302, OLED driver board 1303, polygon mirror 1313, ball bearings 1314, and bearing pillow blocks 1317. There are two more elements not shown in FIG. 4 because OLED 1315 is occluding the parts. The occluded elements are Lens Assembly 1114, and Prism 1113 as shown in FIG. 6c. The goal of the moving x, y, and z, axes is to provide a means to automatically position the second ellipsoid focal point 304, at the center of rotation of the wearer's eye, as shown in FIG. 9 and discussed below. All three boards are moved in a coordinated fashion in order to achieve this goal. This process is done independently for the both right and left eye projectors.

Figure 10:
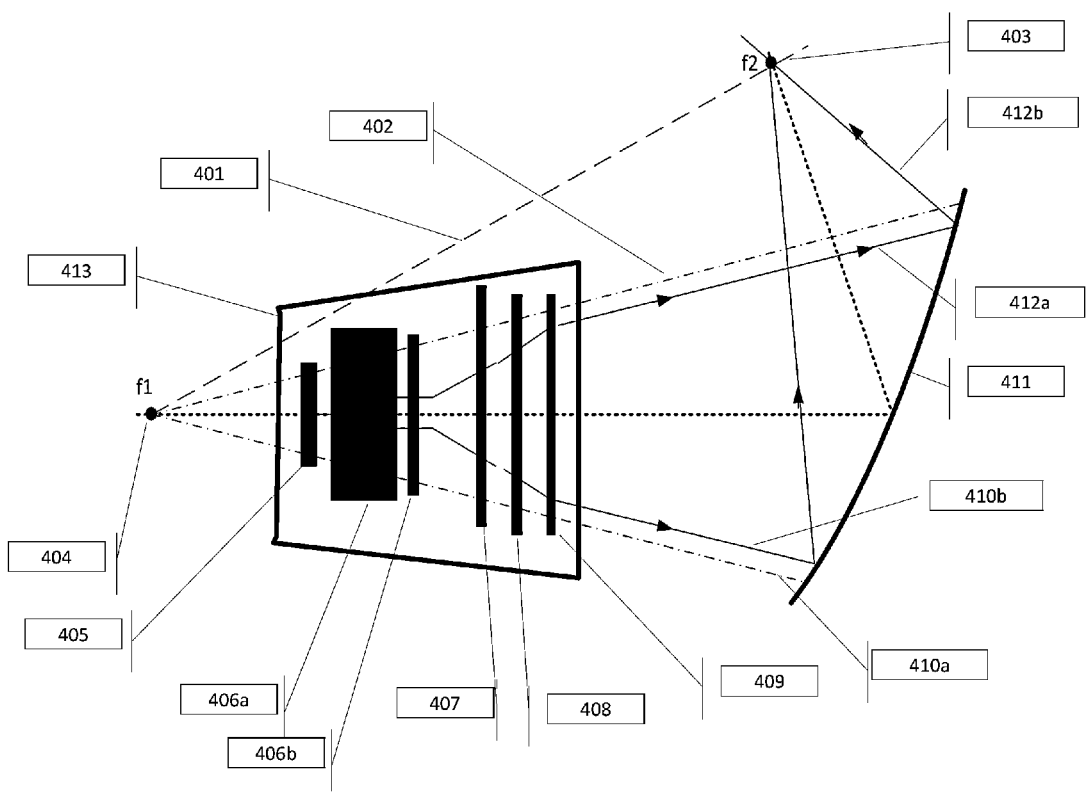
FIG. 10 shows the internal construction, OLED, lenses, and mirrors of the optical subassembly shown in FIG. 9

The optical path for projecting an image on an eye's retina photonically starts at the Organic Light Emitting Diode (OLED) array 1315, which is part of an optical subassembly. A generalized view of the optical subassembly 413 is shown in FIG. 10. The subassembly comprises OLED 405, a lens assembly 406a, a prism 406b, a first stationary folding mirror 407, the polygon mirror 408, and a folding mirror 409.

Below the OLED 1315 in FIG. 4 are the lenses, prism, and mirrors 406-409 shown in FIG. 10 that de-magnify the image. This is done to reduce the facet size and polygon 1313 size to its smallest dimensions. The lens assembly 1114 in FIG. 6c also can vary the magnification or diopters from −5 to +3 using motor 1301. A prism 1113 in FIG. 6c, translates the image to the first of four mirrors. The image leaves the prism 1113 collimated. The polygon mirror servo motor 1303 is illustrated in FIG. 4. The polygon mirror 1313 is mounted between two solid and ridge structures called pillow blocks 1317. The polygon's shaft is attached to the pillow block through ball bearings 1314. The final element of the optical path is the ellipsoid mirror section 1302.

Initially, a wearer puts on the goggles and presses an "on" button (not shown), then the printed circuit boards 1305, 1310, and 1311 move to default positions, which are the nominal positions of each board. A target image is generated internally by the system and displayed. The wearer adjusts the goggles using both hands until the identical target images are seen with both eyes. A button is pressed on the side of the goggles 1308 once the image is seen by one eye. Using the eye tracking cameras 1107 & 1110 in FIG. 6c, and a series of alignment images the projectors in the goggles are aligned to its wearer. Alignment parameters for several wearers can be stored in the display controller 1206 in FIG. 2. Automatic focus of the optical axis is done in order to support large variations of refractive errors in the wearer's vision. Both myopia and hyperopic correction is done from −5 to +3 diopters which allow most wearer's to use the invention without eyeglasses. A small electric motor 1301, shown in FIG. 4, adjusts only the refractive elements in the optical subsystem 1315. The remaining optical components consist of reflective elements.

There are two optical pathways with this invention that require measurement to ensure that the image is as clear as possible. The first is adjusting the focus of the wearer to the display and the second is focusing the camera platform to the gaze of the wearer. Adjusting the focus of the goggles is achieved by entering the wearer's prescription. The software in the display controller will then adjust the focus to control the goggle to match the wearer's prescription. The second involves using a camera module option that plugs into the goggles. The camera module consists of two high resolution camera assemblies with two rotational degrees of freedom for each camera. Eye tracking in the goggle is used to move the left and right eye cameras in coordination with the wearer's left and right eye, as described in further detail below.

When the goggles are initially donned, a curved plate is pressed against the wearer's forehead 1316. This plate maintains a consistent reference point after the alignment process is completed.

Additional space used for electronics or sensor options, such as GPS or control buttons, is shown at 1308.

Figure 5:
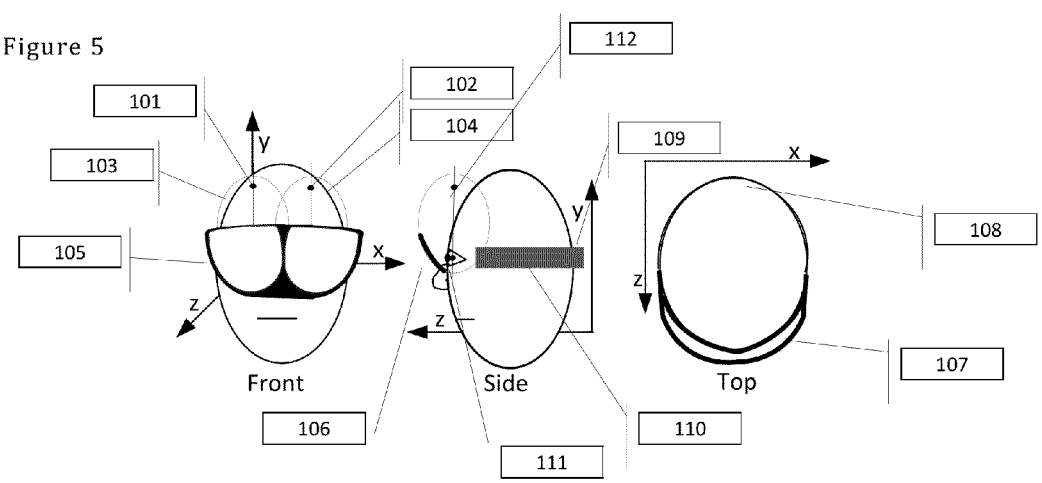
FIG. 5 illustrates the general alignment of the goggle described herein and how an ellipsoid section is selected and used for the goggle design.
Figure 6:
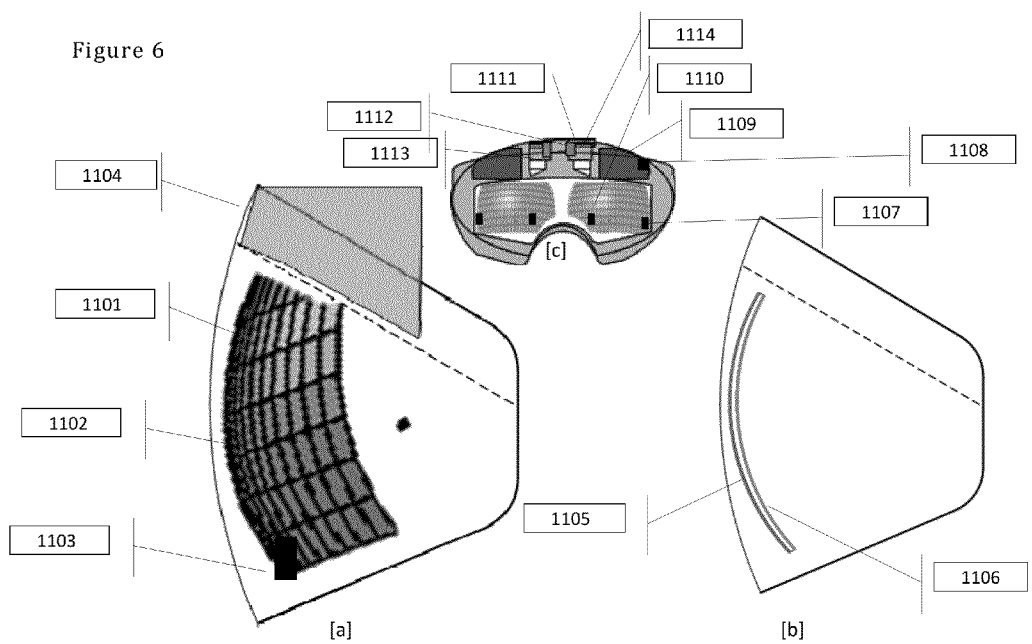
FIG. 6(a) is a diagram showing a side view of one embodiment of the goggle.
FIG. 6(b) shows how the goggle's outside lens fits with respect to the ellipsoid mirror.
FIG. 6(c) is a front view of one embodiment of the goggle.

FIG. 5 shows an illustration of how an ellipsoid sector is applied to the construction and function of the goggle 105. An ellipsoid 106 is mathematically defined by two foci as shown in 111 and 112. For this implementation of the invention one of the focus points is chosen to be the image source 101, 102, and 112. If the inside wall of an ellipsoid were mirrored, light emitted from one focus point would reflect off of the internal mirrored wall and go through the other focus point. This property is used by this invention to directly place an image on the back of the goggle's wearer's retina.

A specific section of the ellipsoid was chosen because its location allowed the mirror to be mounted in the goggle 105. In addition, other considerations on choosing the location of the ellipsoid section are the field of view of the goggle and where to locate the image source.

The image is formed on the retina by placing the second focus point at the center of rotation of the eye 111. For the image to be visible over the entire field of view of the eye the following conditions must be met:

a. The image source must seem to be emitted for the first focus point 101, 102, and 112. This process is done when the device is manufactured. Once aligned, the first focus point should not move.

b. The second focus point 111 must be placed at the center of rotation of the wearer's eye. This process must be done for every wearer. A process that consists of a set of special alignment targets is presented to the wearer in sequence. Initial alignment begins with finding the center of gaze, which is accomplished by placing targets virtually straight in front of the goggle. Both projectors are used with the distance calibrated to a known distance away. Then using a sequence of spiral of dots, each dot is presented individually to the wearer. The last test is showing several 3D photos with single objects presented in the fore field at different distances. For each picture the location of the wearer's left and right eyes are temporally stored. After the testing is completed a mapping of distance to eye triangulation is calculated. Once done for the wearer the settings can be stored.

c. The ellipsoid section covers the field of view of the eye. This process is completed during the design and manufacturing phase.

The goggle is held against the wearer's face by a wide elastic strap that is under tension 1110.

Power, communication, and the image displayed are sent to the goggle through a cable assembly comprising four fiber optic cables and two copper wires. This cable plugs into a connector that is mounted on the back side of the wearer's head 108, 109.

The general equation for an ellipsoid given in Cartesian coordinates is:

$$\frac{x^2}{a^2} + \frac{y^2}{b^2} + \frac{z^2}{c^2} = 1 \qquad (1)$$

Where lengths a, b, and c are called the semi-axes. The shape generated is called a spheroid if two of the semi-axes are the same. If c<a the shape is called an oblate spheroid and if c>a the shape is called a prolate spheroid. When all three axes are different the shape is called a triaxial ellipsoid. If all three axes are the same the shape is a sphere.

Figure 8A:
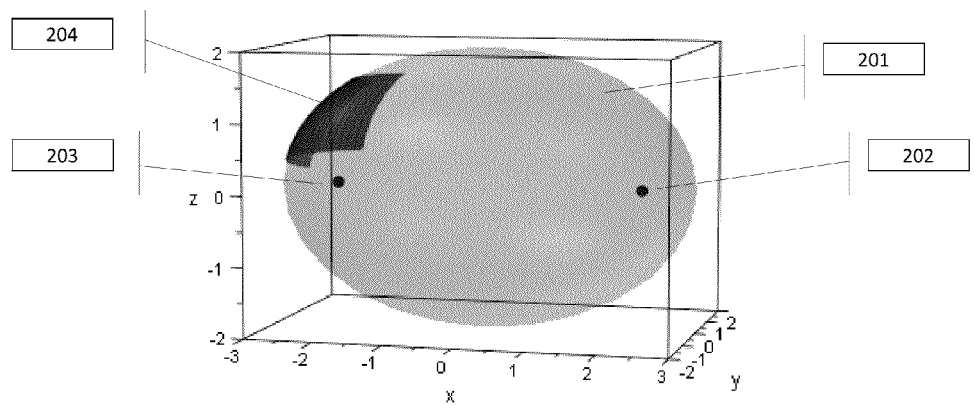
FIG. 8a illustrates one embodiment of a three dimensional ellipsoid with two foci shown as black dots, and a section of the ellipsoid used to design the goggle or other embodiment of the invention.

One embodiment of the invention uses a spheroid where the two common axes have the same radius of 2 inches and the third axis has a radius of 3 inches. A computer generated ellipsoid 201 shown in FIG. 8*a* illustrates a 2×2×3 ellipsoid.

Spherical parametric equations, (2), (3), (4) derived from the common ellipsoid equation (1) are used to determine the best mirror location within a spheroid and relative to a wearer's eye.

$$x = a \cos u \sin v \quad (2)$$

$$y = b \sin u \sin v \quad (3)$$

$$z = c \cos v \quad (4)$$

for u=[0,2π) and v=[0,π]

An illustration of one of methods how a wide FOV image is placed onto the eye's retina is shown in FIG. 8*a*. An ellipsoid mirror section 204 is positioned in front of the eye where the ellipsoid's focus point 203 is positioned to the center of rotation of the wearer's eye. Both refractive and reflective optics condition the image such that it seems to be originating from the ellipsoid's other focal point 202.

Figure 8B:
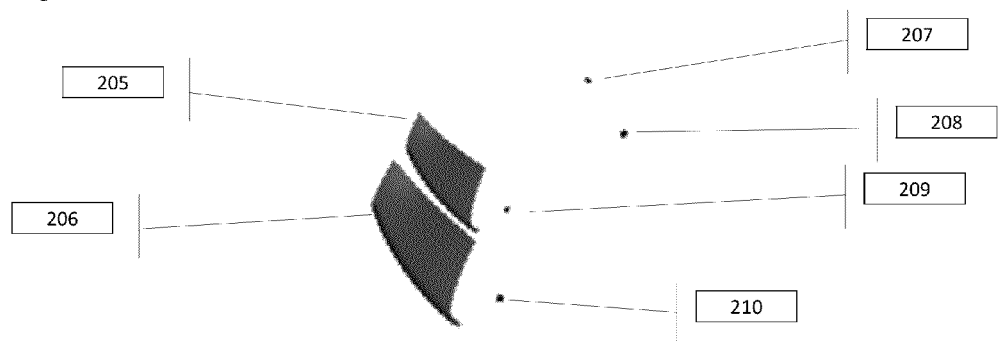
FIG. 8b illustrates two of the ellipsoid sections from FIG. 8a placed side-by-side in the same matter used by the invention.

The design criterion for selecting the mirrored section is shown in FIG. 8*b* where one ellipsoid mirror section is placed in front of each eye. In one embodiment of the invention, the major axis of the ellipsoid is rotated from the horizontal to allow for sufficient clearance between the projector module and the wearer's forehead. The image source has to emanate or seem to emanate from the source foci 207 and 208. Two images emanating from 207 and 208 reflect off of the mirrored surfaces of the ellipsoids 205 and 206. Then the reflected rays go through foci 209 and 210, presenting an inverted image on the back of the wearer's retina.

FIG. 9 shows the basic application of the ellipsoid shape and mirror to the invention. The foci of the ellipsoid are f1 301 and f2 304. The ellipsoid main axis is shown at 302. The optical axis is moved "off-axis" such that the image source can be located above the wearer's head while reflecting off the ellipsoid mirror 305 and going through the focus point 304. Focus point 304 is positioned at the center of rotation of the wearer's eyes. An optical subassembly 306 is placed between the source focus point 301 and ellipsoid 305. The optical subassembly has the characteristics that the light rays emitted from 306 should trace backwards to focus point 301. This will allow the light to reflect off the ellipsoid mirror and through the eye's center of rotation focusing on the wearer's retina.

FIG. 10 shows one embodiment of the optical subassembly. The ellipsoid's major axis 401 and the two foci 403 and 404 are shown. The light emitting segmented image source is an Organic Light Emitting Diode (OLED) 405. The output from the OLED goes through multi lens system 406 that reduces the magnification of the image and provides a dynamic focus control of the light reflects off a relay mirror 407, a servo controlled polygon mirror 408, and another relay or folding mirror 409. Light emitted from 409 appear as if the entire image originated from focus point 403. From relay mirror 409 the light rays reflect off the ellipsoid mirror, with the emitted rays 410*a* and 412*a*. The reflected rays are 410*b* and 412*b*. The light rays that reflect off the ellipsoid mirror 411 are focused through the ellipsoid's second focus point 403. This focus point must be aligned to go through the wearer's eye's center of rotation.

Figure 11:
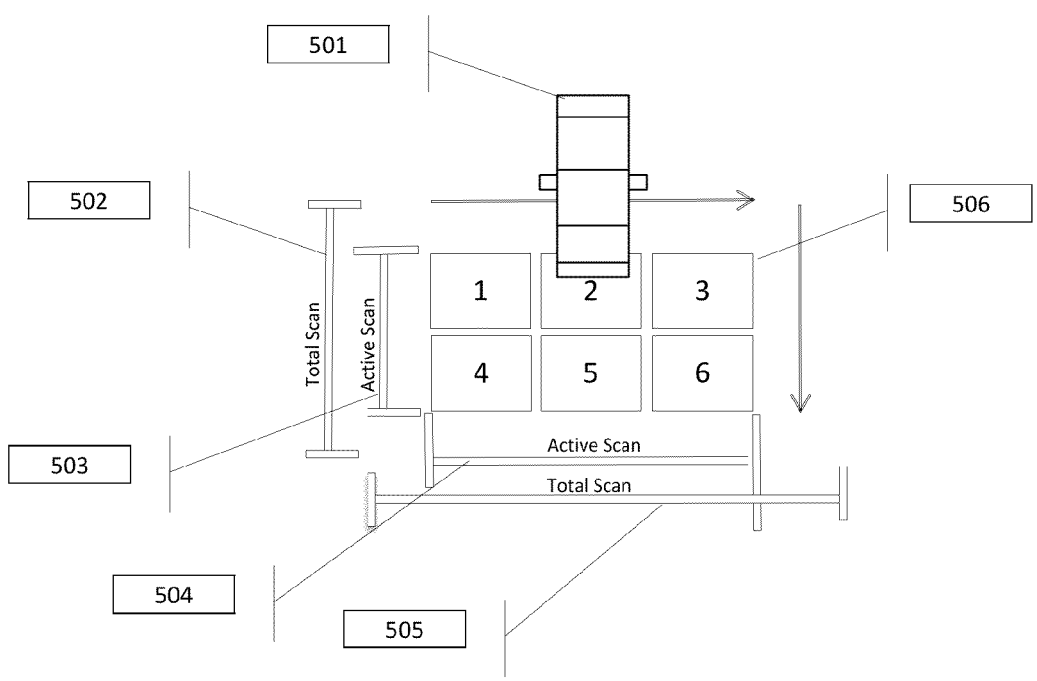
FIG. 11 is a diagram that shows the rear view of a large field-of-view image segmented into six smaller frames and a hexagon mirror is used to reflect the six frames to their assigned position.
Figure 12:
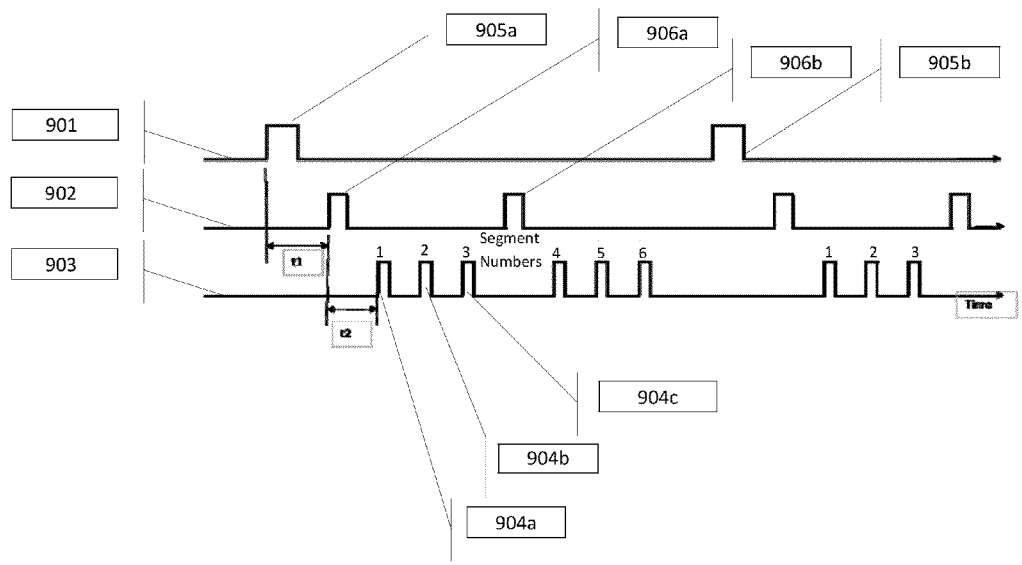
FIG. 12 is a timing diagram that is used to synchronize the servo controlled hexagon mirror's images at a specific update rate.
Figure 13:
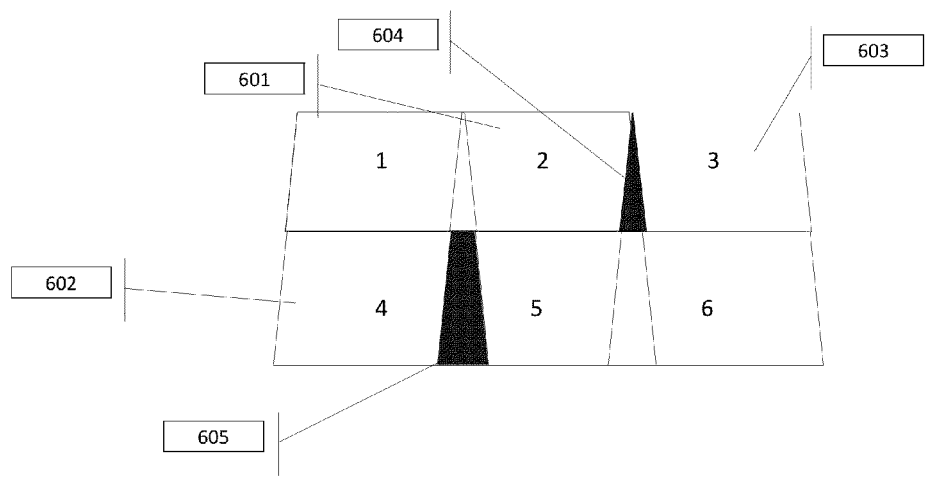
FIG. 13 shows how the stylized image and its six segmented frames described in FIG. 11 will appear when the image is projected off the ellipsoid mirror from the hexagon mirror shown in FIG. 11.

One method to divide the image presented to one eye into multiple frames is shown in FIGS. 11, 12, and 13. FIG. 11 shows a simplified segmented image. The individual segments or frames are labeled 1 through 6 as illustrated in 506. A polygon mirror 501 has one facet for each segment, each facet on the polygon is machined to an angle that will reflect an image emitted by the OLED to a specific segment as shown in FIG. 13. Each facet also has its own magnification that is unique for that specific segment. The polygon mirror 501 is servo controlled to rotate at a fixed velocity of 60 HZ. Optical couplers are attached to the polygon and provide a method to synchronize the projected frames and the facets.

The synchronization is implemented using several electronic signals which can be seen in FIG. 12. Timing of all of the frames requires an initial vertical sync as shown in 901. An opto coupler is used to detect a detent in the side of the polygon mirror. The pulse 905*a* is aligned to occur right before the 1$^{st}$ mirror facet. Internal microprocessor timers are loaded with a value that when reached equals a delay in t1 shown in timing diagram between signals 901 and 902. At this same time the first facet is aligned with the first row of frames. Each positive pulse of signal 901 represents a new set of frames or the beginning of a new image. The next signal is the row sync as shown in signal 902. This signal is also generated using an internal timer in the microprocessor. The row sync timer creates a repeatable delay after the start of the vertical sync. The two pulses 906*a* and 906*b* in between the two vertical sync pulses 905*a* and 905*b* indicate the beginning of two rows. The last signal is the column sync signal 903. The start of the row sync pulse triggers the column counter to start counting. Once the delay is reached (signal 904*a*, delay t2) the column row pulse is generated. The fourth timer controls the delay and generation of the two remaining column sync pulses 904*b* and 904*c*. The three column sync pulses that occur between the row pulses determine when the projector emits an image. The numbers 1, 2, and 3 above the first set of three pulses 904*a-c* and the second set of three pulses 4, 5, and 6 shown in FIG. 12 occur on signal 903 and are directly correlated with the image segments 506 shown in FIG. 11. When, for example, facet 6's column pulse changes from low to high, the display controller will have loaded segment 6 into the OLEDs array buffer. At the rising edge of signal 903, pulse 6 will trigger the OLED array to be pulsed on for 6 microseconds. When the light from the OLED strikes the surface of the polygon's facet 6, it is at an angle to reflect the image to segment 6 on image 506.

When the OLED array projects an image, the image is reflected off a rotating polygon mirror. As the mirror rotates continuously the image being projected on each facet is turned off before it is smeared. That limit is half of the angular translation between two pixels. This results in the image for each image segment being projected onto the wearer's retina for approximately six microseconds.

Delivering a clear and undistorted image requires applying several modes of correction to compensate for every distortion source. In one embodiment of the invention, the distortion correction is spread across several sub systems. For example, geometric aberrations and magnification variation are compensated for in the polygon's facet design. The mirrors and other optical elements are used to correct distortion due to geometric aberration and magnification variation across the frame. Luminosity variation across each of the image's sub-frames is compensated at the image source by current control of the pixels across the Organic Light Emitting Diode array (OLED) using a lookup table.

The lookup table is constructed as a separate RAM buffer that is associated with the pre-distort buffers. One method to implement a lookup table is a structure of data for every pixel in the pre-distort buffer. An example is shown in Table 1.

TABLE 1

| Variable | value | units | Notes |
| --- | --- | --- | --- |
| Segment Number | 1 | | An integer between 1 and maximum segments |
| Pre-Distort Location | [x, y, z] | pixels | Location points x, y, z in the buffer |
| Post-Distort Location | [x, y, z] | pixels | Location of points x, y, z in the post-buffer |
| Color | [R, G, B] | RGB | Color of pixel |
| Luminosity | 130 | 0-255 | Luminosity of pixel |
| Pixel Pixel Radius | 5 | 0-32 | Closest pixel in post-distortion |
| Color Radius | 2 | 0-32 | Radius of adjacent pixels that are set to the same color as the post-distortion pixel |

Keystoning and distortion caused by the curved ellipsoid section and the retina are corrected using hardware algorithms and lookup tables. The algorithms are mapped to an ASIC which is part of the display buffer 1001 in FIG. 7. An example of Keystoning is shown in FIG. 13. The polygon 501 is, for this example, positioned horizontally in the middle of the display. Vertically, the polygon is above and behind the display. The six frames shown in 506 do not show the effects of Keystoning. The same six segmented frames are shown in FIG. 13.

Only Keystoning is illustrated without any distortion in FIG. 13. The Keystoning causes all of the segmented frames to change from rectangles to trapezoids. Each facet on the polygon is designed to slightly overlap the frames as shown in 604 and 605. The overlap will cause the image to be brighter wherever an overlap occurs. To correct the overlaps from becoming brighter than adjacent pixels the luminosity of the overlap pixels are modified. This information is pre-calculated during manufacturing and stored in a lookup table.

Keystoning and distortions require using pixels to correct their effects to the image displayed to the wearer. This results in lost resolution. The problem would grow rapidly as shown in FIG. 13, frames 2 and 3, 601 and 603 respectfully. The overlap is shown by 604. The pixels in the overlap areas shown in 604 and 605 would be lost to correcting the luminosity and preventing a visual gap to the wearer. In fact, pixel loss grows as a square function as the pixel's distance increases. The overlap 605 between frames 4 and 5 is a trapezoid compared to the smaller triangle of the overlap between frames 2 and 3 of FIG. 13.

Distortion would contribute to the lost pixels as well. The location of the polygon mirror is optimized to minimize the Keystoning effect.

Figure 7:
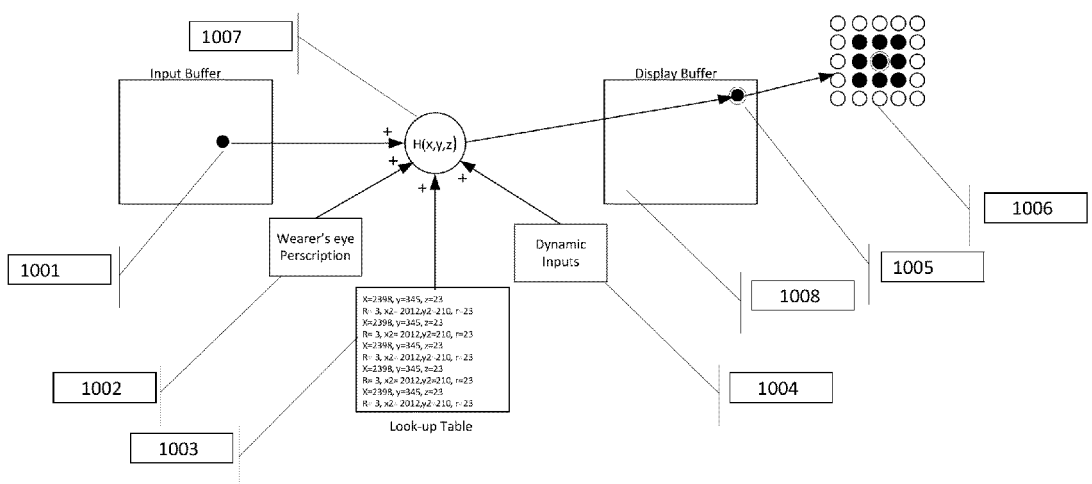
FIG. 7 is a diagram showing how an image from a display buffer for one eye is pre-distorted using a mapping algorithm.

The system corrects for the effects of Keystoning and distortion by empirically measuring the Keystoning and distortion during manufacturing and placing the data in the lookup table 1003 shown in FIG. 7. This method is called mapping and is dependent on the superposition principle, which assumes that Keystoning, distortion, wearer's prescription, and dynamic inputs can be treated individually with their correction terms summed together. This results in each pixel's location being offset by the addition of the terms shown as inputs to the mapping algorithm 1007.

The mapping algorithm's goal is to pre-distort the image's pixels as they are moved to the display buffer 1008, such that when the image is pulsed onto the eye, the wearer sees a clear and undistorted image. The pre-distorted image mapping expands all image segmented frames to a pre-distorted image larger than the image source. The oversized pre-distorted image is scaled to "fit" with the image buffer space. Depending on the distance between adjacent images pixels each image pixel's color is applied to gap pixels created by the pre-distortion algorithm 1007.

In three dimensional space the algorithm executes a standard graphics transformation matrix that rotates, translates, and scales the image. This process is performed during the engineering development of the device. The effects of distortion due to the ellipsoid and the retina are loaded and stored in a lookup table. During normal operation the lookup table describes the offset required for each pixel (See Table 1). The size and the value within the lookup table are defined by the number of segments required to display an image. A simple, but modified Direct Memory Access (DMA) is executed on the buffer ram. A traditional DMA consists of a custom ASIC that has internal registers for data source, data destination, and size of data package. The modified DMA differs from the traditional DMA because of the additional process before and after the move is complete. Before the DMA is turned on, the Display Controller Processor writes the number of bytes to transfer, source address and destination address into the DMA Controller's internal registers. DMA is the typical method to transfer large amounts of data without consuming the Display Controller's Processor code execution time. Alternative solutions could use the Display Controller's Processor directly to move the data. The segment number is stored as a variable in the lookup table. The segments are transmitted to the goggle in numerical sequenced DMA transmission to the goggles over fiber optic cables. In addition to the DMA transmission of the data, the metadata defined in Table 1 is sent with the data as well.

The luminosity value must be set and the Pixel-Pixel Radius sets adjacent pixels to the same color as the Post-Distortion Pixel. The mapping is shown moving the pixel from the input buffer 1001 to the input to the multi input mapping algorithm 1007, to the pre-distortion buffer 1005. An example of illustrating the effect of pre-distortion to expand the image size is shown in 1006. The mapping function 1007 maps the pixel from the input buffer 1001 to a different and expanded position in the display buffer 108. The display buffer 1008 has "gaps" between pixels that are adjacent in the input buffer. The same pixel color is used to fill-in the spaces between input pixels.

Figure 14:
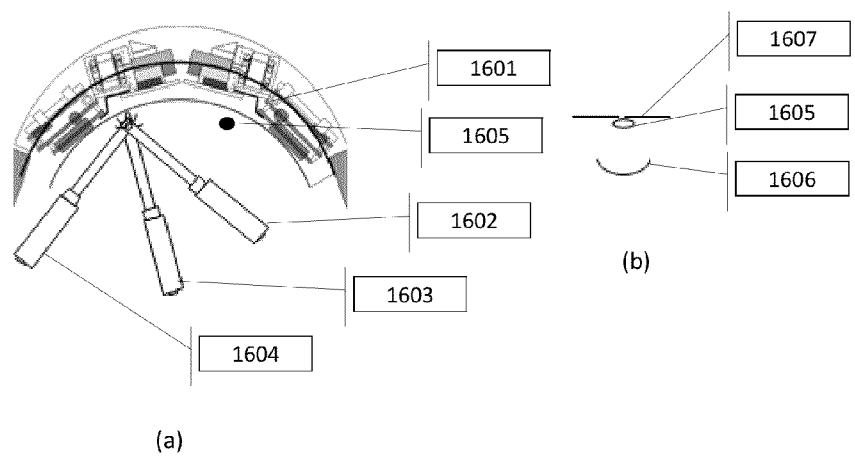
FIG. 14 is a top view of goggle manufacturing equipment used to correct and update the lookup table.
Figure 15:
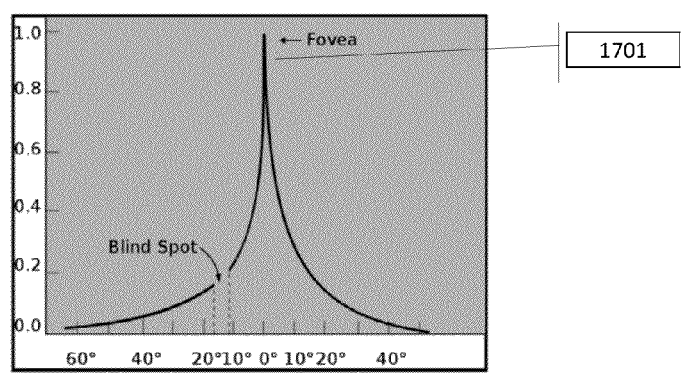
FIG. 15 is a graph showing the human eye's visual acuity versus field of view.

The lookup table 1003 is tested for accuracy and modified during manufacturing. As part of the final manufacturing process the finished goggle is placed into a custom designed goggle tester. The default values in the lookup table were developed during the engineering development phase. The manufacturing test removes variations in part dimensions by testing then modifying specific pixels in the image. An example of the goggle test is shown in FIG. 14a. The goggle is placed in a clamp down holder in which the goggles are positioned in a vertical reference 1601. Two glass hollow hemispheres are mounted where the wearer's eyes would typically be located. The posterior side of the hemispheres 1606, shown in FIG. 14b, are lightly frosted. A biconvex lens is mounted in same location as the lens of a typical human eye 1605, which is 17 mm in front of the hemispheres. The lens system is designed to be a reduced eye, which means that a single lens 1605 and aperture 1607 are being used to model all of the refractive surfaces of the human eye and the varying refractive indexes at their interfaces. The cameras and glass hemispheres are mounted on two pivoting arms. Each arm's rotation axis passes through the eye's center of rotation. Several test images are then displayed on both left eye and right eye projectors. The image is displayed on the back of the frosted hemispheres. Three images are taken at both rotational extremes (0 to 120 degrees) 1602 and 1604, and at the typical location of the eye's fovea 1603. The images are then processed with software that initially verifies that the nondistorted image shown on the back of the hemispheres is within one half of the distance between the image sources' pixels. Next a test that determines if the calibration is accurate to correct for a wearer's Myopia and Hyperopia is performed. This is accomplished by changing the position of the lens and aperture along the goggles optical axis. An additional test checks if the calibration is sufficiently accurate to correct for a wearer's astigmatism. The third test verifies that the lookup table that was developed by engineering during development is accurate enough to operate with normal operations.

This invention also allows for the wearer to input dynamic data into the goggle's operational parameters. The dynamic input allows for a few very restrictive parameters to be set by the wearer.

If the wearer typically wears glasses his prescription can be entered and stored in the goggle's display controller. Correction for Myopia and Hyperopia retinal focus is achievable for most wearer's eye prescription 1002. Each projector has its own motor 1112, as shown in FIG. 6c, that can change the diopters of the projector system left and projector system right in the positive and negative direction. In addition, any astigmatism can also be corrected. This data is stored in a different and separate part of the display controller 1002. Astigmatism is corrected by entering the x axis rotation and magnification and then entering the y axis rotation and magnification. The calculation for correcting astigmatism requires numerous computation cycles. The high computational resources are minimized by conducting calculations when the goggles are not being used. Once the calculations are completed the display controller will store the results in the lookup table.

Provisions for other aberrations that require dynamic inputs are identified by 1004.

Embodiments of the goggle can be either immersive or see-through. The goggles shown in FIG. 6(b) contain an ellipsoid section which is semi-mirrored on the inside surface 1106 as well as coated with special Liquid Crystals 1105 that work on curved surfaces. By changing the voltage across the Liquid Crystal's pixels, light can be blocked or allowed to be transmissive. In other embodiments of the invention a three axes accelerometer 1108 in FIG. 6c is mounted in the goggle assembly. By applying a single integration or double integration to the outputs of the accelerometer the velocity and position of the head are determined respectfully. Knowing the position, velocity, and acceleration of the head, along with eye tracking allows the location and orientation of the eyes to be known at any time. One example of how the head position, velocity, and acceleration are applied is in endoscopic surgery. A single robotic arm that has multiple degrees of freedom can be controlled with head movement. A surgeon using this feature could control a robotic arm holding an endoscopic camera by moving his head. This will allow for the surgeon to have both hands free while performing endoscopic surgery. In one embodiment, the surgeon could control the arm using head motion, and then disable the control when needed. This will allow the surgeon to continue with the surgery without having to keep his head motionless. In general surgery the surgeon could operate in total immersive mode. The display controller can superpose, for example, a tumor in a liver. The tumor location and dimensions would be obtained by processing MRI or CT scans. Using the accelerometer for inertial tracking of the head allows the perspective of the tumor to change as the surgeon moves his head.

In addition to sensors like the accelerometer the goggles have a specialized eye tracking ability. Two cameras and infrared light emitting diodes (LEDs) are used for each eye. A camera and LED are packaged together as shown in 1103, 1107 and 1109 in FIG. 6a. The camera has a minimum sample rate of 200 Hertz. The high sample rate is required to track the eye over its entire range of motion and throughout its acceleration and velocity profiles.

The invention's ability to project a wide field of view and high acuity display onto the goggle wearer's eyes requires a video input with equal capabilities. In addition, the camera must provide vergence control for a more natural real time focus and 3D reality.

The human eye has varying resolution. The highest resolution occurs at the fovea 1701 which has a resolution of 20/20 and a field of view of approximately 3 degrees. The peripheral region of the eye has a general resolution of 20/200. The brain takes the high resolution and the low resolution portions of an image projected onto the retina and transmits them over the optical nerve to the portion of the brain called the visual cortex. The visual cortex is located at the posterior part of the brain. This region takes the high resolution narrow field of view image and maps it across the low resolution wide field of view image. The result is that the entire image seems to be high resolution.

Figure 16:
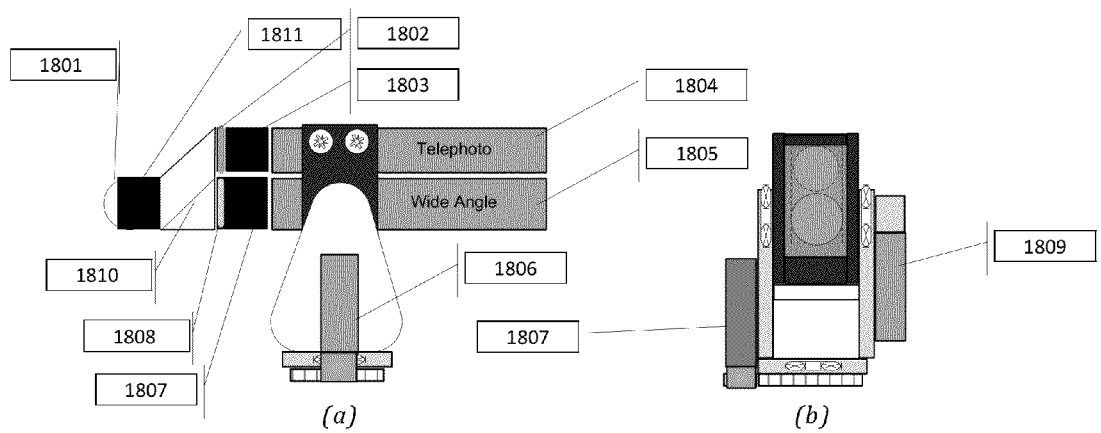
FIG. 16 is a wide field of view, high-resolution camera attached to a two axes gimbal system.
Figure 17:
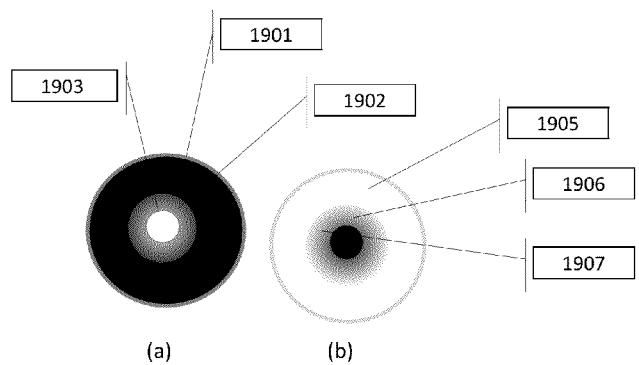
FIG. 17a is a neutral density filter for a high-resolution narrow field of view camera.
FIG. 17b is a neutral density filter for a low-resolution wide field of view camera.

The camera shown in FIG. 16 mimics the way the retina processes an image. A wide field of view lens 1801 starts the optical path for the camera. The image is collimated through lens assembly 1811 before going through a beam splitter 1810. The image is now split into two paths, one is high resolution and the other low resolution. The low resolution path image goes through a neutral density filter shown in FIG. 17b. The filter has three regions, the first is transparent 1905, the second is gradient 1906 which varies from transparent to opaque, and the last region is opaque. Next the low resolution path image goes through another lens package 1807 that focuses the image into the charge-coupled device (CCD) array of a wide angle camera 1805. The high resolution path starts from beam splitter 1910 then goes through a neutral density filter shown in FIG. 17a that also has three regions. The first region is opaque 1901, the second is a gradient from opaque to transparent 1902 and the third is transparent 1903. The portion of the image that passes through the filter is only a small central region measuring 10 degrees of field of view at the beginning of the gradient. The narrow image then goes through a lens assembly 1803 that magnifies and focuses the image onto the CCD array of camera 1804.

Figure 18:
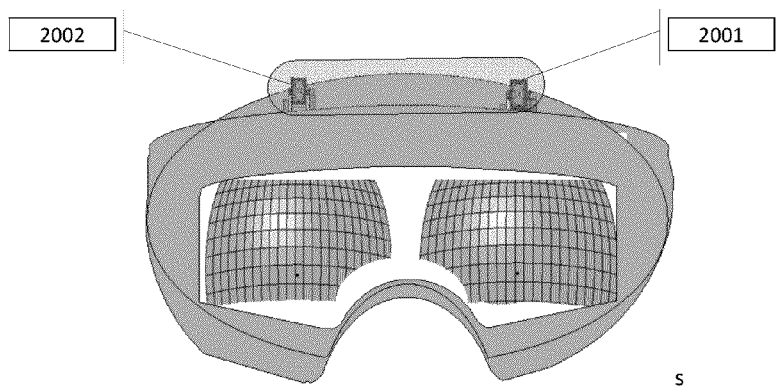
FIG. 18 is a front view of goggle with camera module.

The image has now been optically divided into a high and low resolution image and converted to an electrical signal stored in the CCD array of two cameras. The camera is part of a camera module that attaches to the top of the goggles shown in FIG. 18, at 2001 and 2002. The camera module contains two cameras. The camera output is transmitted to the display controller and stored in the macular centered buffers 1402 and 1404. The display controller combines the high resolution and low resolution images from the cameras. From the macular centered buffers the image is moved to the pre-distortion buffers 1507b and 1507d, which are located in display buffer 1403 and 1405. From the pre-distortion buffers the images are sent back to the goggles to be projected onto the wearer's retina as described above.

Figure 19:
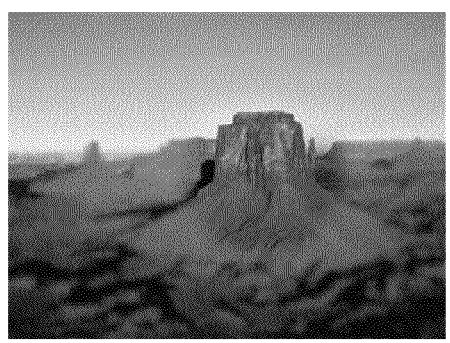
Figure 19:

The resulting output of this high-resolution, low-resolution and wide-field-of-view camera is shown in a simulated photograph FIG. 19a. The central region of the photograph has a high resolution which gradually blends to low resolution for the rest of the photograph. A magnified part of the central and blending regions of the photograph is shown in FIG. 19b.

Figure 20:
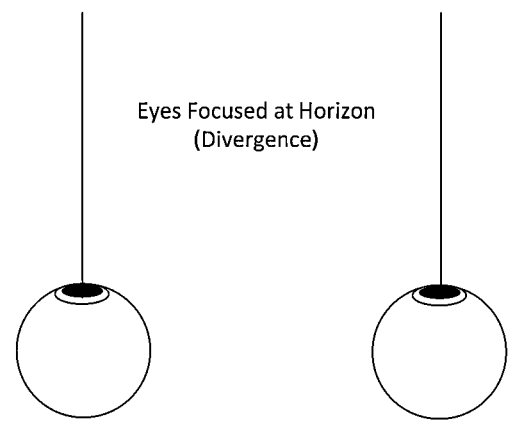
FIGS. 20 and 21 illustrate vergence control at far and near focal points, respectively.
Figure 21:
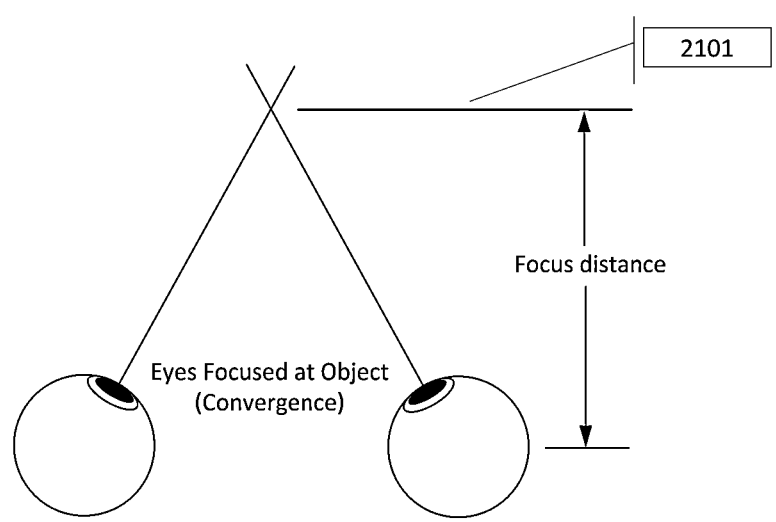

Vergence control captures two movements of human eyes. The first occurs when a person stares in the distance; the eyes diverge and are parallel as shown in FIG. 20. When a person's gaze is near, the eyes converge and the focus is at a point 2101 which is a specific distance away, as shown in FIG. 21.

Wide-angle eye tracking is required such that the eye's position is known across the eye's entire field of view. Two miniature cameras 1107 and 1110 in FIG. 6c and 1103 in FIG. 6a, each with an infrared LED, are used for each eye. The cameras are mounted at the bottom edge of the ellipsoid mirrors. The position of the eye at any moment is critical. Typical cameras sample at 60 to 120 frames per second. Sample rates of 60 to 120 hertz are too slow for accurate eye tracking. This invention uses a sampling camera of at least about 250 hertz which can track the eye even at the eye's maximum velocity, which is 500 degrees per second.

The eye tracking data is used as an input to the camera servo system. The servo system does not attempt to continuously track the eye's movement with the camera. Instead the eye movement is broken down into stages. The eye starts at rest then the person moves the eye usually in a saccadic motion towards whatever has captured his attention. The eye eventually decelerates and comes to a stop. The human brain does not process the images coming from the retina during saccadic motion. The brain waits until the eye stops before the images become part of the person's conscience. The time it takes from the moment the eye stops moving until the time the brain completes processing the image varies from person to person. The range for most of the population is 30 ms to 200 ms. The servo system is designed to complete a move from where the eye started a saccadic move to where the eye ends the saccadic move in less than 15 ms.

Each camera shown in FIG. 7 uses two motors to respond to the eye's saccadic movements. One motor controls the pitch angle 1809 and the other controls the yaw angle 1806 and 1807.

The goggle processor coordinates the motion of these two motors by sending a position trajectory to the motor's servo code. The servo code then calculates a current command that is sent to the motor driver. The current command is calculated by the servo code and its value is proportional to the error in position between the position trajectory input and the current position of the camera angle The high resolution camera described above and shown in FIG. 17, the wide angle eye tracking and the servo code and system work together to create vergence control for the vision platform. The primary benefit of vergence control is that it provides the goggle wearer with 3D stereo images that are very close to reality. Vergence control is achieved by mimicking two systems in the human body, retinal/brain physiology, and human eye dynamics and producing a high-definition narrow-field-of-view and low definition wide-field-of-view that moves with the wearer's eyes.

The invention could provide an increased quality of life for individuals suffering from Macular Degeneration, other retinal diseases, brain injuries, or other visual shortcomings. The invention could use a video source mounted directly to the goggle or another portion of the wearer's body, which would supply an image directly to the retina of the individual.

This invention also provides an enhanced vision solution for four types of surgical categories: robotic assist, general, endoscopic, and surgical microscopes. The advantages of the current invention are identified by category.

Robotic Assist Surgery.

Current solutions create a 3D stereo image by using two high definition LCD monitors. One monitor presents an image to one eye and the other monitor presents a similar image but from a slight horizontal offset from the image source. The two monitors along with two wide angle lenses and packaging produce a large costly system that requires a hydraulic mechanism to move the vision system into position. The image is clear but resolution is limited along with a narrow field-of-view. The surgeon must keep his head affixed in the same position for the duration of the surgery. The current invention separates the surgeon from a fixed viewing point. The surgeon can move around to a comfortable position, adjusting his or her head as desired while continuing to receive a clear, wide field-of-view, high resolution image. The current invention is also significantly more cost efficient that the large LCD solution.

General Surgery.

Current vision enhancement solutions in open surgery are limited to eye loops and microscopes (discussed below). Eye loops can give the surgeon the correct magnification, but the field-of-view is limited. The new camera described herein could be mounted to the goggle and provides an image that has similar magnification, has a wide field-of-view, and has resolution similar to the human eye. The camera module's servo systems track the surgeon's eye motion, including where the surgeon is focusing his attention. This dynamic focus control, called vergence, is discussed in detail above.

Endoscopic Surgery.

Current solutions in endoscopic surgery generally have the surgeon holding a camera tool in one hand and a surgical tool in the other hand. The surgeon sees the camera output on a flat monitor. The current invention can be connected to a 3D video camera connected to a camera tool and can provide the surgeon with image clarity similar to the human eye. In addition, the 3D camera in conjunction with the current invention provides the surgeon with depth perception.

Surgical Microscopes.

With current solutions the surgeon views the patient using traditional microscope oculars that consist of two eye pieces that are adjustable in width to align to different people eye separation. The surgeon must move his head toward then away from the eyepieces in order to find the spot where the entire image is seen by both eyes. Most surgical microscopes also have a camera option that displays the camera image on a high definition monitor.

There are some 3D cameras used with surgical microscopes that present a passive 3D image. The 3D image is seen on flat screen monitors only when special polarized glasses are worn. The hardware then alternates between the left and right eye polarization screens mounted on the front of the monitor. The current invention allows the surgeon to move independently from the microscope, compared to existing systems that require the surgeon to keep his eyes fixed, looking into the microscope's oculars. This invention, using the microscope as the video input, gives the surgeon the freedom to sit or stand in a comfortable position. His head can be positioned naturally, looking at his hands.

Existing flat screen solutions require the surgeon to look to the left or right to see the flat screen monitor. This is true for 2D or 3D monitors. The invention's image resolution presented to the surgeon is similar to that of the human eye. Human eye resolution is achievable only with microscope camera with similar resolution as the camera described herein.

The current invention can display existing High Definition protocols, such as MP4, but the resolution will not be near the capabilities of the invention. In order to take full advantage of the invention's resolution capabilities, the camera described in FIGS. 16-19 is required.

With the modularity and functionality of the invention it could be used for many other purposes. For example, the oil and gas and entertainment industries would benefit significantly from the invention.

Two primary applications in the oil industry would be remote piloting of Remotely Operated Vehicles (ROVs) and 3D data analysis. Current navigation of ROVs in subsea oil and gas applications uses several flat 2D panel displays and joy sticks. The 3D Stereo Vision Platform with 120 degrees field of view for each eye can greatly simplify ROV control. The wide field of view (FOV) coupled with the 3 axes accelerometers in the goggles could be used to offer natural head motion camera control. When the ROV is moving, the high resolution and wide FOV makes it easy to make a multiple camera interface given to the navigator.

Oil and gas companies also have very large data warehouses where they store many years of seismic data. The wide FOV and high acuity of the invention make it ideal to use if for the display and review of the 3D data. This is a camera-less based application in which the seismic data is rendered then sent to the display. If the optical interface to the goggle was used to display the seismic data then that would be an easy way to use the full resolution of the goggle vision platform. In entertainment the first product that would be a natural fit for this invention is the ubiquitous gaming console. Virtual reality goggles and glasses have tried before with mixed success to penetrate this market. All of the products have only provided a seemingly larger display to look at and not addressed the total immersion effect. This invention would provide the total immersion affect or the missing feature that has limited widespread adoption of virtual reality in the gaming industry.

Those of ordinary skill in the art will recognize the other industries would benefit from use of the invention described.

While this patent has described specific embodiments of the invention, those of ordinary skill in the art will recognize other embodiments, improvements, and modifications within the spirit of the invention, and such embodiments remain within the scope of the present invention, which is limited only by the following claims.

What is claimed is:

1. An apparatus for projecting a series of images onto a retina of an eye comprising:
    a. An image input for receiving a series of images;
        At least one processor for dividing the images to generate a series of segmented images;
    b. A light emitting device for projecting the series of segmented images from a first focus of an ellipsoid;
    c. A first mirror; and
    d. A second mirror;
        Wherein the light emitting device projects said series of segmented images off the first mirror and the second mirror and wherein the second mirror is positioned such that the series of segmented images are reflected to a second focus of the ellipsoid representing a center-of-rotation of the eye.

2. The apparatus of claim 1, wherein said first mirror is a rotating polygon mirror.

3. The apparatus of claim 1, wherein said first mirror is a vector mirror.

4. The apparatus of claim 1, wherein said light emitting device comprises at least one of an organic light emitting diode, a laser, a light emitting diode (LED) or a liquid crystal display (LCD).

5. The apparatus of claim 1, further comprising a lens package for collimating said segmented images before the projection off said first mirror.

6. The apparatus of claim 1 further comprising a pair of goggles for aligning said light emitting device, said first mirror, and said second mirror with respect to the second focus of the ellipsoid.

7. The apparatus of claim 6, wherein the image input is mounted to the goggles.

8. The apparatus of claim 6, wherein the light emitting device is movable to align with said second focus of the ellipsoid.

9. The apparatus of claim 1, further comprising a liquid-crystal coating on at least a portion of the goggles, wherein changing the voltage applied to the coating adjusts the transmittance of light through the goggles.

10. The apparatus of claim 1, further comprising a device for timing the projection of said series of segmented images off said first mirror.

11. The apparatus of claim 1, further comprising a second image input for receiving a second series of images; a second light emitting device for projecting a second series of segmented images from a first focus of a second ellipsoid; a third mirror; and a fourth mirror, wherein the second light emitting device projects said second series of segmented images off the third mirror and the fourth mirror and wherein the fourth mirror is positioned such that the second series of segmented images are reflected to a second focus of the second ellipsoid representing a center-of-rotation of a second eye.

12. The apparatus of claim 1 further comprising at least one processor for adjusting said series of segmented images to compensate for differences in brightness where said segmented images overlap.

13. The apparatus of claim 1 further comprising at least one processor for correcting for at least one of distortion or Keystoning.

14. The apparatus of claim 1 further comprising at least one camera for tracking movement of the eye.

15. A method of projecting a series of images on a retina of an eye, comprising:
    a. Receiving a series of images;
    b. Segmenting said series of images; and
    c. Projecting from a first focus of an ellipsoid said series of segmented images off a first mirror and a second mirror to a second focus of the ellipsoid representing a center-of-rotation of the eye.

16. The method of claim 15, further comprising collimating said series of segmented images before said series of segmented images is reflected off said first mirror.

17. The method of claim 15 further comprising adjusting the location of a light emitting device to align the second focus point of the ellipsoid with the center-of-rotation of the eye.

18. The method of claim 15 wherein said first mirror is a rotating polygon mirror and each of said segmented images is timed to project off of a designated facet of said rotating polygon mirror.

19. The method of claim 15 further comprising correcting for at least one of image distortion or Keystoning.

20. The method of claim 15 further comprising adjusting said series of segmented images to compensate for differences in brightness where said segmented images overlap.

* * * * *